United States Patent
Guillemot et al.

(10) Patent No.: US 10,075,728 B2
(45) Date of Patent: Sep. 11, 2018

(54) METHOD AND DEVICE FOR MOTION INFORMATION PREDICTION REFINEMENT

(71) Applicants: INRIA INSTITUT NATIONAL DE RECHERCHE EN INFORMATIQUE ET EN AUTOMATIQUE, Le Chesnay (FR); CENTRE NATIONAL DE LA RECHERCHE SCIENTIFIQUE (C.N.R.S), Paris (FR)

(72) Inventors: Christine Guillemot, Chantepie (FR); Laurent Guillo, La Meziere (FR); Thomas Guionnet, Rennes (FR)

(73) Assignees: INRIA INSTITUT NATIONAL DE RECHERCHE EN INFORMATIQUE ET EN AUTOMATIQUE, Le Chesnay (FR); CENTRE NATIONAL DE LA RECHERCHE SCIENTIFIQUE (C.N.R.S), Paris (FR)

( * ) Notice: Subject to any disclaimer, the term of this patent is extended or adjusted under 35 U.S.C. 154(b) by 353 days.

(21) Appl. No.: 13/632,972

(22) Filed: Oct. 1, 2012

(65) Prior Publication Data

US 2014/0092968 A1    Apr. 3, 2014

(51) Int. Cl.
 *H04N 19/52*    (2014.01)
 *H04N 19/597*   (2014.01)

(52) U.S. Cl.
 CPC ........... *H04N 19/52* (2014.11); *H04N 19/597* (2014.11)

(58) Field of Classification Search
 CPC .. H04N 7/50; H04N 7/26244; H04N 7/26031; H04N 7/26015; H04N 7/26707;
 (Continued)

(56) References Cited

U.S. PATENT DOCUMENTS 5,825,456 A * 10/1998 Tabata ............... H04N 13/0055
                                                         348/51
6,011,870 A *  1/2000 Jeng ....................... G06T 7/2026
                                                         375/240.16
(Continued)

OTHER PUBLICATIONS

"Single-Loop Decoding for Multiple Multiview Video Coding" by Ying Chen et al., 978-1-4244-2571-6/08 © 2008 IEEE.*
(Continued)

*Primary Examiner* — Dramos I Kalapodas
(74) *Attorney, Agent, or Firm* — Meagher Emanuel Laks Goldberg & Liao, LLP (57) ABSTRACT

The invention concerns a method for encoding a multi-view video stream comprising at least two video sequences, comprising a step of motion information prediction for a square or rectangular block of a current picture of a current view from a list of candidate motion information predictors, a motion information predictor including at least a motion vector, and a step of entropic encoding of an item of information representative of the position of a selected motion information predictor in the list. The method of the invention comprises, for the encoding of a current block, determining in the list of candidate motion information predictors of the current block a motion information predictor comprising a disparity motion vector pointing to a block of a picture of a video sequence corresponding to a view different from the current view, and in case of positive determination, including in the list of candidate motion information predictors at least one refined motion information predictor comprising a refined disparity motion vector predictor obtained from the determined disparity motion vector so as to obtain a refined list of candidate motion information predictors.

23 Claims, 4 Drawing Sheets

(58) Field of Classification Search
CPC ............ H04N 19/597; H04N 13/0048; H04N 19/00139; H04N 19/00769; H04N 7/26; H04N 81/66; H04N 19/61; H04N 19/513; H04N 19/895; H04N 19/194; H04N 19/52; H04N 19/46; H04N 2213/003; H04N 13/0022; H04N 19/00939; H04N 19/00684; H04N 19/51; H04N 19/533; H04N 19/00781; H04N 19/00733; H04N 19/70; H04N 19/436; H04N 19/58; H04N 19/573; H04N 5/23293; H04N 13/0239; H04N 5/23238; H04N 13/0221; G06K 9/36; G06K 9/46

See application file for complete search history.

(56) References Cited

U.S. PATENT DOCUMENTS

| | | | | |
|---|---|---|---|---|
| 9,716,899 | B2* | 7/2017 | Thirumalai | H04N 19/597 |
| 2008/0089428 | A1* | 4/2008 | Nakamura et al. | 375/240.26 |
| 2008/0285654 | A1* | 11/2008 | Cai | H04N 19/597 |
| | | | | 375/240.16 |
| 2009/0116558 | A1* | 5/2009 | Chen | H04N 19/597 |
| | | | | 375/240.16 |
| 2010/0309286 | A1* | 12/2010 | Chen | H04N 13/0059 |
| | | | | 348/43 |
| 2011/0044550 | A1* | 2/2011 | Tian | H04N 19/597 |
| | | | | 382/238 |
| 2011/0193861 | A1* | 8/2011 | Mashitani | H04N 13/0296 |
| | | | | 345/419 |
| 2011/0255796 | A1* | 10/2011 | Nakamura et al. | 382/232 |
| 2012/0057001 | A1* | 3/2012 | Morifuji | H04N 5/23238 |
| | | | | 348/50 |
| 2012/0213281 | A1* | 8/2012 | Choi | H04N 19/52 |
| | | | | 375/240.16 |
| 2012/0269270 | A1* | 10/2012 | Chen | H04N 19/00684 |
| | | | | 375/240.16 |
| 2013/0057646 | A1* | 3/2013 | Chen | H04N 19/597 |
| | | | | 348/43 |
| 2013/0094580 | A1* | 4/2013 | Zhou et al. | 375/240.12 |
| 2013/0188715 | A1* | 7/2013 | Seregin et al. | 375/240.16 |
| 2013/0287108 | A1* | 10/2013 | Chen | H04N 19/597 |
| | | | | 375/240.16 |
| 2013/0322538 | A1* | 12/2013 | Seregin et al. | 375/240.16 |
| 2014/0016701 | A1* | 1/2014 | Chen et al. | 375/240.14 |
| 2014/0071235 | A1* | 3/2014 | Zhang | H04N 19/597 |
| | | | | 348/43 |
| 2014/0078254 | A1* | 3/2014 | Lin | H04N 19/597 |
| | | | | 348/43 |
| 2014/0185686 | A1* | 7/2014 | Wu et al. | 375/240.16 |
| 2014/0241434 | A1* | 8/2014 | Lin | H04N 19/597 |
| | | | | 375/240.16 |
| 2014/0286421 | A1* | 9/2014 | Kang | H04N 19/597 |
| | | | | 375/240.16 |
| 2014/0341289 | A1* | 11/2014 | Schwarz | H04N 19/597 |
| | | | | 375/240.16 |
| 2014/0341291 | A1* | 11/2014 | Schwarz | H04N 19/597 |
| | | | | 375/240.16 |

OTHER PUBLICATIONS

Tomoyuki Yamamoto et al., "Merge Candidate Refinement for Uni-Predictive Block" JSTVC-I0293, JCT-VC 9th meeting, Geneva, CH, Apr. 27-May 7, 2012 [IDS].*

Benjamin Bross, Joel Jung, "CE9: Summary Report of Core Experiment on MV Coding and Skip/Merge Operations", JCTVC-G039, JCT-VC 7th Meeting, Geneva, CH, Nov. 21-30, 2011.

Tomoyuki Yamamoto, Tomohiro Ikai, "Merge candidate refinement for uni-predictive block", JCTVC-I0293, JCT-VC 9th meeting, Geneva, CH, Apr. 27-May 7, 2012.

Heiko Schwarz, Dmytro Rusanovskyy, « Common test conditions for 3DV experimentation », ISO/IEC JTC1/SC29/WG11 MPEG2011/N12745, Geneva, Switzerland, May 2012.

* cited by examiner

METHOD AND DEVICE FOR MOTION INFORMATION PREDICTION REFINEMENT

TECHNICAL FIELD

The invention relates to digital video coding, and more particularly to the encoding and decoding of multi-view video streams, which comprise a plurality of video sequences of a same scene, captured simultaneously from multiple cameras.

BACKGROUND OF THE INVENTION

Digital video coding is an active field of research and standardization, since digital video is used in many consumer appliances such as laptop or desktop computers, digital cameras, digital recording devices, tablet computers . . . .

In order to efficiently store and transmit digital video data, the digital video data is compressed.

Various compression standards have been developed, and the most recent one, the High Efficiency Video Coding (HEVC), which is presently under development, reaches higher compression efficiency than previous standards, and can be applied for very large picture resolutions.

Similarly to other compression methods, HEVC uses spatial and temporal prediction to reduce the redundancy of the video data and to achieve compression. The spatial prediction consists in predicting picture portions from other portions of the same picture, at the same temporal instant of the video. The temporal prediction consists in predicting a portion of a picture of the video from a portion of another picture of the video sequence, pointed at by a motion vector. The temporal prediction is also called inter prediction.

HEVC has an aim of further improving compression that is achieved by using hierarchical coding units, the basic unit used for carrying information related to prediction processes, called prediction unit, being of variable size and shape (either rectangular or square, with a variable size as from 4×4 to 64×64 pixels), so as to better take into account the content of a video sequence.

Moreover, HEVC proposes mechanisms to further increase the compression by reducing the bitrate of motion information to be transmitted. To this end, in the inter prediction modes, in particular the modes called "merge" and "skip", the motion information associated to a prediction unit is predicted from a candidate list. The candidate list includes motion information of already processed neighbouring prediction units of a prediction unit to be encoded, either in a spatial neighbourhood of the prediction unit to be encoded or in a temporal neighbourhood of the prediction unit to be encoded. The candidate list being predetermined, only an index indicating the position of the best suited motion information predictor for the motion information of the current prediction unit to be encoded is actually encoded and transmitted to the decoder.

An extension of HEVC standard, currently under development, is directed to the compression of multi-view video streams, which comprise N video sequences, with N at least equal to two, captured simultaneously, typically by N cameras which are positioned at different spatial positions. The views are rectified, therefore the cameras are assumed to be aligned. A block of a picture in a first view corresponds to a block displaced on the horizontal axis of a second view, the displacement depending on the distance between the cameras. Several applications can be envisaged for the multi-view video coding, also called 3D video coding, such as stereoscopic television and multi-view 3D television.

In order to take advantage of the potential redundancy offered by the presence of multiple views, a disparity compensated prediction mode has been added to the HEVC inter prediction modes. The disparity compensation refers to motion compensation between prediction units of sequences corresponding to different views: a prediction unit of a current view has a disparity motion vector pointing to a portion of a reference picture of a different view. Further, the list of candidates for motion information prediction comprises, for a current prediction unit to be encoded, the motion information associated to the prediction unit of another view corresponding to the current prediction unit.

There is still a need to further improve compression in multi-view video coding.

BRIEF SUMMARY OF THE INVENTION

To this end, the invention proposes, according to a first aspect, a method of encoding a multi-view video stream comprising at least two video sequences, each video sequence corresponding to a view of a scene, the encoding comprising a step of motion information prediction for a square or rectangular block of a current picture of a current view from a list of candidate motion information predictors, a motion information predictor including at least a motion vector, and a step of entropic encoding of an item of information representative of the position of a selected motion information predictor in said list.

The method comprises, for the encoding of a current block, determining in the list of candidate motion information predictors of the current block a motion information predictor comprising a disparity motion vector pointing to a block of a picture of a video sequence corresponding to a view different from the current view, and, in case of positive determination, including in said list of candidate motion information predictors at least one refined motion information predictor comprising a refined disparity motion vector predictor obtained from the determined disparity motion vector so as to obtain a refined list of candidate motion information predictors.

Advantageously, at least one refined motion information predictor is added to the list of candidates, the refined motion information predictor allowing to add some precision to the proposed motion vector predictors of the candidate list. Some experimental results have shown compression improvement, the refined disparity motion vector predictors proposed providing suitable candidates for inter-view motion compensation.

The encoding method according to the invention may also have one or more of the features below:

According to a second aspect, the invention proposes a method of decoding a multi-view video stream comprising at least two video sequences, each video sequence corresponding to a view of a scene, the decoding comprising a step of determining a list of candidate motion information predictors, for a square or rectangular block of a current picture of a current view, a motion information predictor including at least a motion vector, and a step of entropic decoding of an item of information representative of the position of a selected motion information predictor in said list. The decoding method comprises, for the decoding of a current block, determining in the list of candidate motion information predictors of the current block a motion information predictor comprising a disparity motion vector pointing to a block of a picture of a video sequence corresponding to a view different from the current view, and in case of positive determination, including in said list of candidate motion information predictors at least one refined motion information predictor comprising a refined disparity motion vector predictor obtained from the determined disparity motion vector so as to obtain a refined list of candidate motion information predictors.

The advantages of the decoding method are analogous to the advantages of the encoding method and are not reminded here.

According to a third aspect the invention proposes an encoder adapted to encode a multi-view video stream comprising at least two video sequences, each video sequence corresponding to a view of a scene, comprising a unit for motion information prediction for a square or rectangular block of a current picture of a current view from a list of candidate motion information predictors, a motion information predictor including at least a motion vector, and a unit of entropic encoding of an item of information representative of the position of a selected motion information predictor in said list. The encoder further comprises, for the encoding of a current block:
- a determining unit for determining in the list of candidate motion information predictors of the current block a motion information predictor comprising a disparity motion vector pointing to a block of a picture of a video sequence corresponding to a view different from the current view,
- a unit, applied in case of positive determination, for including in said list of candidate motion information predictors at least one refined motion information predictor comprising a refined disparity motion vector predictor obtained from the determined disparity motion vector so as to obtain a refined list of candidate motion information predictors.

According to a fourth aspect the invention proposes a decoder adapted to decode a multi-view video stream comprising at least two video sequences, each video sequence corresponding to a view of a scene, the decoder comprising a unit for determining a list of candidate motion information predictors, for a square or rectangular block of a current picture of a current view, a motion information predictor including at least a motion vector, and a unit for entropic decoding of an item of information representative of the position of a selected motion information predictor in said list. The decoder comprises, for the decoding of a current block:
- a determining unit for determining in the list of candidate motion information predictors of the current block a motion information predictor comprising a disparity motion vector pointing to a block of a picture of a video sequence corresponding to a view different from the current view,
- a unit, applied in case of positive determination, for including in said list of candidate motion information predictors at least one refined motion information predictor comprising a refined disparity motion vector predictor obtained from the determined disparity motion vector so as to obtain a refined list of candidate motion information predictors.

The invention will be better understood in the light of the detailed description and accompanying drawings, which are only exemplary and by no way limiting.

DETAILED DESCRIPTION OF THE INVENTION

The invention will be described in the context of the multi-view coding extension of HEVC standard under development, in particular as described in the document ISO/IEC JTC1/SC29/WG11 MPEG2011/N12744, "Test Model under Consideration for HEVC based 3D video coding v3.0» of April 2012, but can more generally apply in motion information prediction for multi-view video coding.

As explained in the introduction, HEVC has an aim of further improving compression, by improving spatial and temporal prediction and by reducing the bitrate of the motion information. In multi-view coding extension of HEVC, the inter-view redundancy between several views of a scene, shot simultaneously by image capture means such as video cameras, is further taken into account.

In HEVC, pictures of a video sequence are divided into a sequence of coding tree units (CTUs), which are splitted into coding units (CUs). A CTU consists of an mxm block of luminance samples, together with two corresponding blocks of chrominance samples for a picture having three sample arrays. A CU is a basic unit of region splitting, it is square and may take a size from 8×8 up to the size of the CTU.

The coding unit (CU) is the basic unit of region splitting used for intra and inter coding. Each CU may contain one or more prediction units (PU), depending on the partition mode. The prediction unit, which is a square or rectangular block of size varying from 4×4 to 64×64, is the basic unit used for carrying information related to prediction processes.

A prediction unit can be intra or inter coded. Several inter coding modes are defined, including a "skip" mode, a "merge" mode and an "inter" mode. In all inter coding modes, a PU shall have an associated motion information which is a list of motion parameters comprising a motion vector, a reference picture index and a reference picture list usage flag.

In the following, the basic unit used in the motion prediction process will be termed either block or prediction unit.

Figure 1:
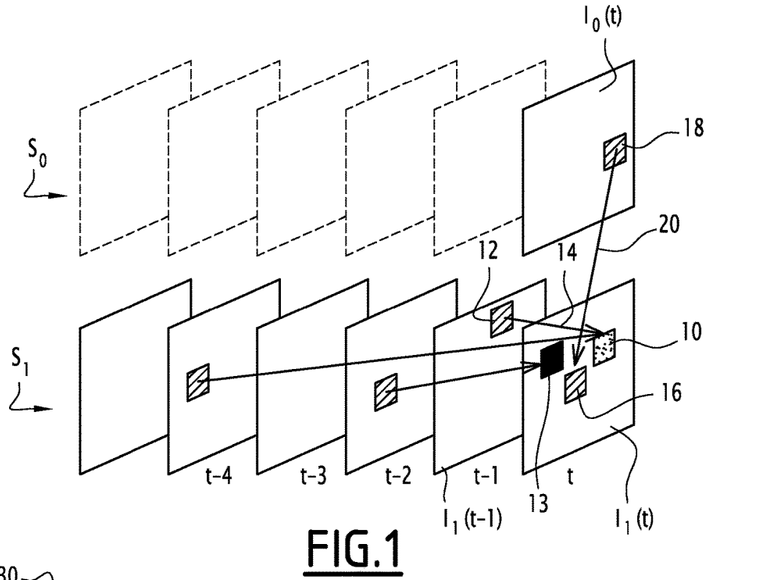
FIG. 1 schematically illustrates motion prediction in multi-view video coding.

FIG. 1 illustrates schematically motion prediction and compensation as envisaged in multi-view video coding. Two video sequences, S0 and S1, are illustrated in FIG. 1, each corresponding to a view of a scene, respectively S0 corresponds to a view V0 and S1 corresponds to a view V1. Each video sequence comprises a plurality of pictures $I_0$, $I_1$, which are taken at simultaneous temporal instants. The temporal motion prediction refers to the prediction of blocks of a current picture in a sequence Si from blocks of reference pictures, already encoded, of the same sequence Si. A forward prediction is illustrated in FIG. 1, using a list of pictures, called list 0 which contains pictures which have temporal indexes lower than the current picture. As an example, block 10 of current picture $I_1(t)$ is predicted from block 12 of picture $I_1(t-1)$ via motion vector 14, which is a temporal motion vector.

A prediction from a picture of another view, called inter-view prediction, has been added. For example, block 16 of picture $I_1(t)$ may be predicted from block 18 of $I_0(t)$ via the motion vector 20. Such an operation is referred to as disparity compensated prediction, and the motion vector 20 is referred to as a disparity motion vector.

Therefore, in multi-view video coding, a picture of a different view, of the same temporal index as the current picture, is added to the list of reference pictures to be used for motion prediction and motion compensation.

The example of FIG. 1 illustrates a case of multi-view coding with two views. The multi-view encoding is however not restricted to two views, an arbitrary number of views is considered. In such case, in one embodiment, only the closest view (in terms of proximity of the camera positioning) to the current view is used for disparity motion compensation. In an alternative embodiment, all the views already coded are used for disparity motion compensation.

Also, it shall be noted that in the representation of FIG. 1, square blocks have been used for motion compensation. As already explained, this is not restrictive, the blocks or prediction units used as coding units for motion prediction may be either square or rectangular shape.

Figure 2:
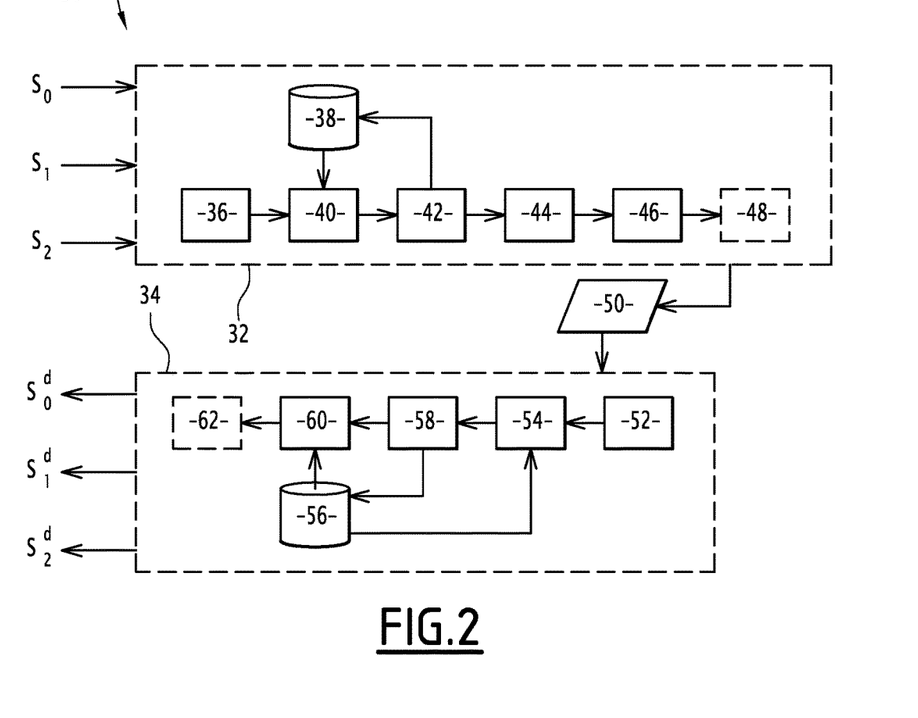
FIG. 2 is a block diagram of a multi-view encoding and decoding system.

FIG. 2 illustrates schematically a multi-view video encoder and a multi-view video decoder according to the invention. The illustration is partial, only the modules related to motion prediction are represented.

The system 30 comprises an encoder 32 and a decoder 34. The encoder 32 receives as an input a plurality of video sequences, referenced in this example S0, S1, S2, each representative of a respective view V0, V1, V2, of a scene. The encoder 32 comprises a module 36 of obtaining a current block $Bc(I_k(t))$ of picture $I_k(t)$ of Sk of view Vk to be encoded in an inter prediction mode. A block to be encoded using "skip" or "merge" mode is considered. The block $Bc(I_k(t))$ corresponds to a so-called prediction unit of HEVC and has a size comprises between 4×4 and 64×64.

Available information from already encoded pictures of the video stream is stored in memory 38. Such information comprises in particular motion and texture information related to the pictures of the sequence Sk of view Vk and also motion and texture information of picture $I_{k-1}(t)$ of a picture of same temporal index "t" of video sequence Sk−1 of view Vk−1, representative of a different view from the current view.

The encoder further comprises a module 40 adapted to implement means for determining a list of candidate motion information predictors for the current block. The list is ordered according to a predetermined order and comprises motion parameters obtained from neighbouring blocks of the current block $Bc(I_k(t))$, which have already been encoded and are stored in memory 38. The neighbourhood considered comprises spatial, temporal and inter-view neighbours, as explained in more detail with respect to FIG. 3. For a given block, the motion information comprises, in a uni-directional prediction mode, a motion vector, a reference picture index and a reference picture usage flag. In bi-directional prediction mode, the motion information comprises a motion vector per prediction list, an associated reference picture index for each motion vector and a reference picture usage flag.

According to the invention, the encoder further comprises a module 42 for refinement of the list of candidate motion information predictors.

In an alternative embodiment, the module 40 adapted to determine a candidate motion information predictor comprises the means of module 42 for refining the list of motion information predictors. The refined list of motion information predictors is temporarily stored in memory 38.

The encoder 32 further comprises a module 44 adapted to select a best candidate, according to a given distortion-rate criterion, for the current block to be encoded, from the list of motion information prediction candidates, and a module 46 adapted to encode the index $i_c$ of the selected motion information predictor. In HEVC, the index encoding comprises unary encoding of the index followed by entropic arithmetic encoding, called CABAC (for "context-adaptive binary arithmetic encoding").

The encoder 32 also comprises a module 48 for texture residue encoding, which is used in "merge" mode.

In the "skip" mode, a HEVC coding unit is represented as a single prediction unit, and is encoded only via the motion information prediction. Therefore, only an index of the position of the motion information predictor in the list of motion information predictors candidates is encoded and transmitted to the decoder.

The encoder 32 outputs a compressed multi-view bitstream 50, which may be stored or transmitted by any suitable transmission means to the decoder 34.

The motion compensation tools of the decoder 34 comprise a module 42 adapted to extract the bitstream portion corresponding to a current block $Bc(I_k(t))$ to decode, and to decode parameters for decoding the current block, in particular an index $i_c$ designating a position of a motion information predictor in a list of motion information predictors.

The module 54 of the decoder 34 is analogous to the module 40 of the encoder 30, and is adapted to implement means for determining a list of candidate motion information predictors for the current block to be decoded. The neighbouring blocks of the current block have already been decoded and stored in memory 56. Therefore, the decoder can apply the same process as the encoder to determine a list of candidate motion information predictors.

The decoder 34 also comprises a module 58, analogous to module 42 of the encoder, for refining the list of motion information prediction candidates. The refined list is temporarily stored in memory 56.

A module 60 of applying motion compensation for the current block to decode uses the decoded index $i_c$ and the refined list of motion information predictor candidates to determine the actual motion information predictor associated to the current block and applies the motion compensation.

The decoder further comprises a module 62 adapted to apply texture residue decoding, if necessary in the "merge" mode, so as to completely decode the current block.

As a result, the decoder outputs decoded video sequences $S_0^d, S_1^d, S_2^d$, corresponding to the views V0, V1, V2, which can be provided to a unit adapted to display them, for example for 3D visualization.

The modules of the encoder 32 and decoder 34 can be implemented in hardware, software codes or a combination of both, using a processor such as a central processing unit (CPU) of a computer, a microprocessor or a field programmable array (FPGA). Such a processor is configured to execute machine readable codes, in a programming language. In software, the invention is implemented as a computer program comprising a computer-readable storage medium having thereon instructions that, when executed, cause a processor of a device for encoding or decoding to execute the steps for determining a refined list for motion information prediction candidates as explained in detail here below.

Figure 3:
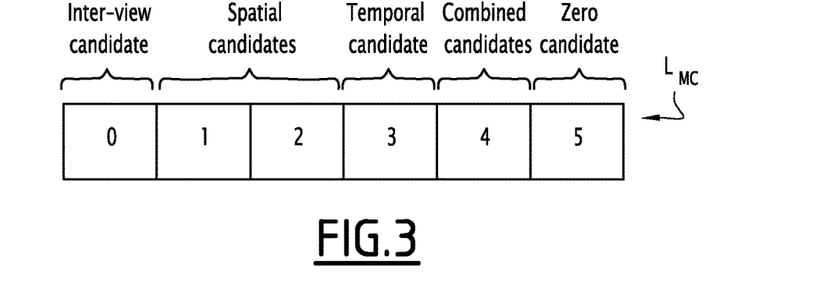
FIG. 3 illustrates schematically a list of motion information prediction candidates.

FIG. 3 illustrates a list $L_{MC}$ of motion information prediction candidates for a current block $Bc(I_k(t))$, which contains a maximum number of items which is predetermined, equal to 6 as specified in document ISO/IEC JTC1/SC29/WG11 MPEG2011/N12744, "Test Model under Consideration for HEVC based 3D video coding v3.0» of April 2012, and the items are ordered according to a predetermined order.

The first candidate, which is positioned at index 0, is the inter-view candidate, i.e. the motion information associated to the disparity compensated block $B_{dp}$ of the picture $I_{k-1}(t)$ at the same temporal instant of the view $V_{k-1}$ previously encoded.

The candidates positioned at indexes 1 and 2 are spatial candidates, associated respectively to spatial neighbours of the current block $Bc(I_k(t))$, typically the blocks situated at the top and on the immediate left of the current block.

The candidate positioned at index 3 is a temporal candidate, referring to the motion information associated to the co-located (i.e. at the same spatial position) block in a previous reference picture of the same sequence is considered. For example, the motion information associated to the co-located block in the picture $I_k(t-1)$ is considered.

A candidate obtained from a combination of spatial and temporal candidates, as described in section 3.4 of document "ITU-T SG16 WP3 and ISO/IEC JTC1/SC29/WG11/: JCTVC-I1002", "HM7: High Efficiency Video Coding (HEVC) Test Model 7 Encoder Description" of April 2012, is positioned at index 4 in the list.

Finally, a "zero" motion vector, meaning that the current block is predicted directly by its co-located block of the previous picture, is present in the list at index 5.

As already explained, the motion information associated to a block includes at least one motion vector pointing to a block of a reference picture, which may be a picture from the same sequence, same view in the case of temporal prediction or a picture from a different sequence representative of a different view, in the case of inter-view prediction.

Figure 4:
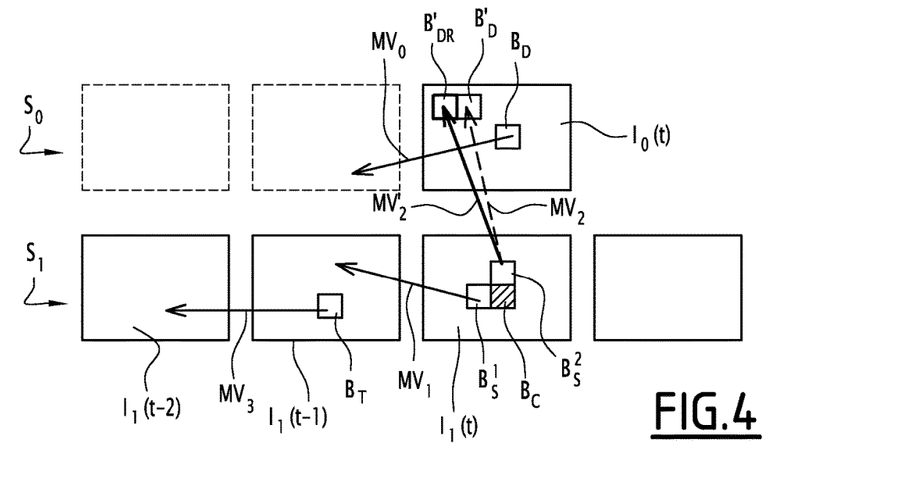
FIG. 4 illustrates an example of spatial, temporal and inter-view motion neighbours used for motion information prediction.

FIG. 4 illustrates schematically spatial, temporal and inter-view candidates of the neighbourhood of a current block, in the case of unidirectional prediction, where the motion information comprises only one motion vector pointing to a reference picture.

For the current block to be encoded $B_c$ of picture $I_1(t)$ of view V1, the inter-view candidate is the motion information associated to block $B_D$ of picture $I_0(t)$ of view V0. In this example, $B_D$ has an associated motion vector $MV_0$ which is a temporal motion vector, pointing to a block of picture $I_0(t-1)$ of view V0.

The two spatial candidates are respectively noted $B_s^1$ and $B_s^2$, corresponding to the left and top blocks of the current block.

It may be noted that in this example, all blocks are represented of equal size, but this is however not limiting. In the case where the considered blocks are prediction units of HEVC, they may have different sizes. The selection of spatial neighbours of a current prediction unit for the determination of a list of motion information candidates is then applied as in HEVC as described in section 3.4 of document "ITU-T SG16 WP3 and ISO/IEC JTC1/SC29/WG11/: JCTVC-I1002" "HM7: High Efficiency Video Coding (HEVC) Test Model 7 Encoder Description" of April 2012.

In this example $B_s^1$ has a temporal motion vector $MV_1$ pointing to picture $I_1(t-1)$ of the same sequence of view V1. The block $B_s^2$ has a disparity motion vector $MV_2$, pointing to a block $B'_D$ of the picture $I_0(t)$ of view V0.

The temporal neighbour of the current block $B_c$ is block $B_T$ of picture $I_0(t-1)$ which has a temporal motion vector $MV_3$ pointing to a block of picture $I_0(t-2)$.

The motion information prediction candidates comprising the respective motion vectors $MV_0$ to $MV_3$ are stored in the list $L_{MC}$, as represented in FIG. 3, to form the ordered list of motion information predictors of current block $B_c$.

In this example, all the neighbours of the current block $B_c$ are inter coded and have an associated motion vector, either a temporal motion vector or a disparity motion vector.

However, in some cases, one or several of the neighbouring blocks of the current block $B_c$ are encoded in spatial mode, using spatial prediction, and therefore do not have associated motion information. In this case, the list of candidate motion information predictors is smaller. For example, if block $B_s^1$ is encoded using spatial prediction, the list $L_{MC}$ would comprise only five items, indexed from 0 to 4, respectively an inter-view candidate, a spatial candidate, a temporal candidate, a "combined" candidate and a "zero" candidate.

According to the invention, a refinement of the list $L_{MC}$ of motion information prediction candidates is proposed, by introducing at least one refinement motion vector corresponding to a disparity motion vector found in the initial list $L_{MC}$.

Referring to the example of FIG. 4, the motion vector $MV_2$ of block $B_s^1$ is a disparity motion vector pointing to a block $B_D'$ of $I_0(t)$. A refined motion information prediction candidate, comprising a disparity vector $MV_2'$ is introduced, the vector $MV_2'$ being obtained by applying an horizontal shift of a predetermined offset value to $MV_2$. In the example of FIG. 4, the disparity motion vector $MV_2'$ calculated points to $B_{DR}'$ of $I_0(t)$ which is slightly shifted horizontally with respect to $B_D'$. If the motion compensation is applied at the precision of ¼ pixel (quarter pixel precision), a horizontal shift of +p results in a displacement of the block $B_D'$ of p/4 pixels.

More precisely, considering that the disparity vector $MV_2$ has coordinates $(v_x, v_y)$, then $MV'_2$ has coordinates $(v_x+p, v_y)$.

In a preferred embodiment, two horizontally shifted motion vectors are calculated and inserted in the refined list of candidates, with respective shifts of +4 and −4 corresponding to respective displacement of +/−1 pixel of the prediction block.

More generally, two offsets of +p and −p are applied.

Figure 5:
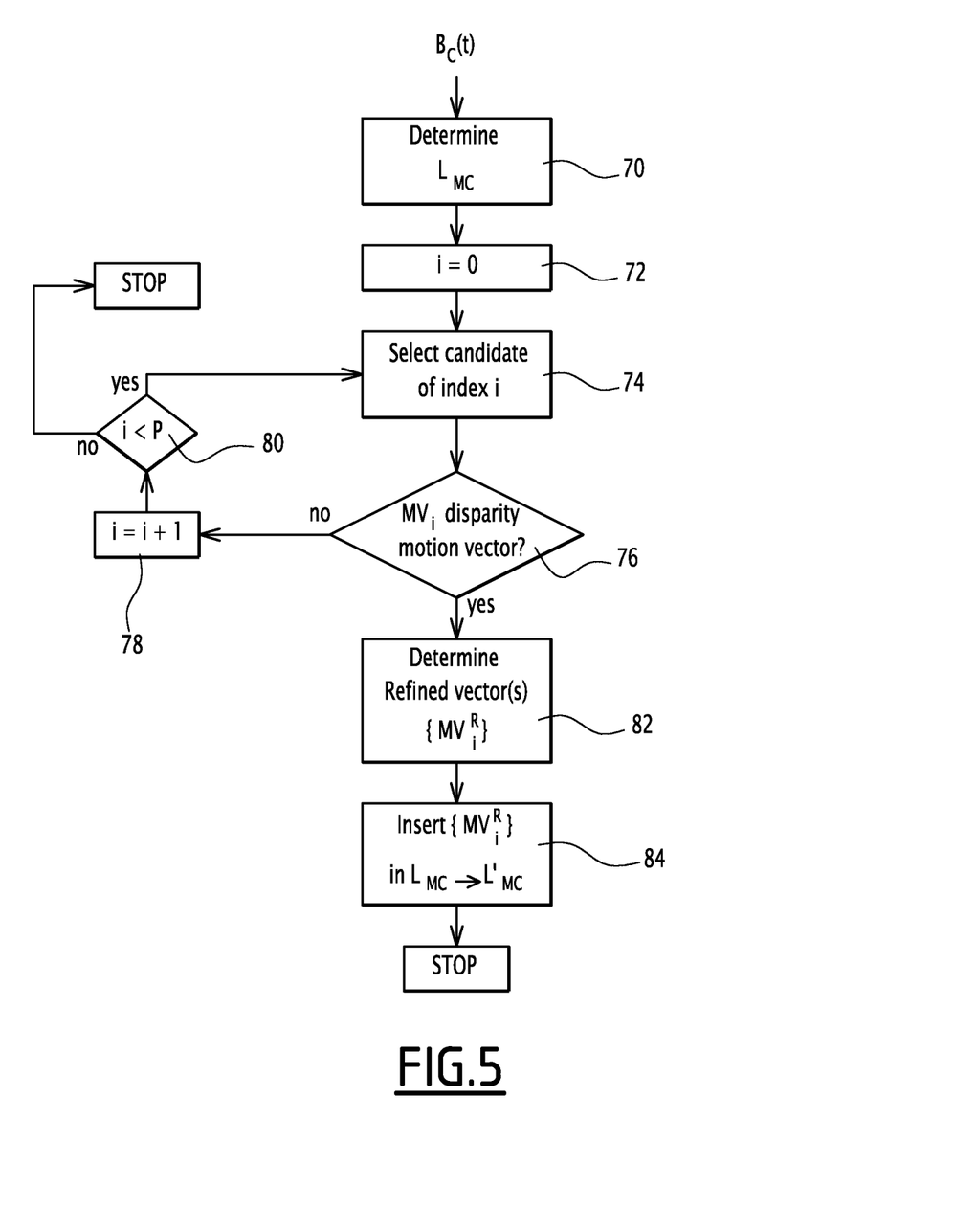
FIG. 5 is a flowchart of a method of obtaining a refined list of motion information prediction candidates according to the invention.

FIG. 5 is a flowchart of a method of obtaining a refined list of motion information prediction candidates according to the invention, which is implemented either by an encoder or by a decoder according to the invention.

A current block $B_c(t)$ of a current picture $I_k(t)$ of sequence Sk of view $V_k$ corresponding to the kth view of the scene is provided as an input.

In a first step 70, an ordered list $L_{MC}$ of motion information prediction candidates for the current block is determined as explained above with reference to FIGS. 3 and 4. In this embodiment, the list $L_{MC}$ includes potentially an inter-view motion information prediction candidate, two spatial motion information prediction candidates, a temporal motion information prediction candidates and a "combined"

and a "zero" candidates. More generally, the list comprises a predetermined maximal number P of candidates.

An index i is initialized to 0 in next step 72, and the motion information prediction candidate at position i in the list, noted $MP_i$, is selected at step 74. Therefore, the list $L_{MC}$ is scanned in the order of increasing indexes.

In step 76, the motion vector or vectors associated to $MP_i$ are extracted and analysed.

In the case of unidirectional prediction, only one motion vector $MV_i$ is present.

In the case of bi-directional prediction, two motion vectors, respectively $MV_{i0}$ associated to the list L0 and $MV_{i1}$ associated to the list L1 are extracted.

Still in step 76, it is determined whether either the unique motion vector MVi or if $MV_{i0}$ and/or $MV_{i1}$ are disparity motion vectors, i.e. as explained above, point to a block of a picture, which is the picture at the same temporal index in this example of embodiment, of a different view.

In case of negative answer, step 76 is followed by an increase of the index i by 1 (step 78), followed by a step 80 of checking whether index i is smaller than P which is the number of items of list $L_{MC}$. In case of positive answer, step 80 is followed by previously described step 74. Otherwise, the process stops.

In case of positive answer at step 76, i.e. if the motion vector or at least one of the motion vectors specified by the motion information predictor $MP_i$ is a disparity motion vector, step 76 is followed by a step 82 of calculation of a set $\{MV_i^R\}$ of refined disparity motion vectors.

In the preferred embodiment, two refined motion vectors are calculated from the first disparity motion vector $MV_{id}$ found in the list $L_{MC}$, the two refined disparity motion vectors being symmetrically shifted, horizontally, from the disparity motion vector $MV_{id}$, by a predetermined shift value p, comprised preferably in the interval [1, 64].

Let $MV_{id}$ be the first disparity vector found. In the case of unidirectional prediction, $MV_{id}$ is equal to $MV_i$.

In the case of bi-directional prediction, if the motion vector associated to L0, $MV_{i0}$ is a disparity vector, then $MV_{id}$ is equal to $MV_{i0}$. If the motion vector $MV_{i0}$ is a temporal motion vector and $MV_{i1}$ associated to L1 is a disparity motion vector, then $MV_i$ is equal to $MV_{i1}$. Even if both $MV_{i0}$ and $MV_{i1}$ are disparity motion vectors, in this embodiment, the motion vector associated to L0 is selected for the calculation of the refinement motion vector.

The calculation of the refined motion vector consists in adding a predetermined offset to the x-coordinate of $MV_{id}$.

More generally, if $MV_{id}(v_x, v_y)$ then $MV_i^{R1}(v_x+p1, v_y)$ and $MV_i^{R2}(v_x+p2, v_y)$, p1 and p2 being respectively a first and a second horizontal shift.

In a preferred embodiment, adapted for pictures of resolution 1920×1088 pixels, p1=−4, p2=4.

In an alternative embodiment, only one refined motion vector is calculated.

So the set of refined motion vectors $\{MV_i^R\}$ may comprise one or several refined disparity motion vectors shifted horizontally.

The refined motion vectors are introduced as motion information prediction candidates in step 84 in the list of motion information prediction candidates $L_{MC}$ to obtain a refined list $L'_{MC}$ of motion information prediction candidates.

Several embodiments are envisaged for step 84.

Figure 6:
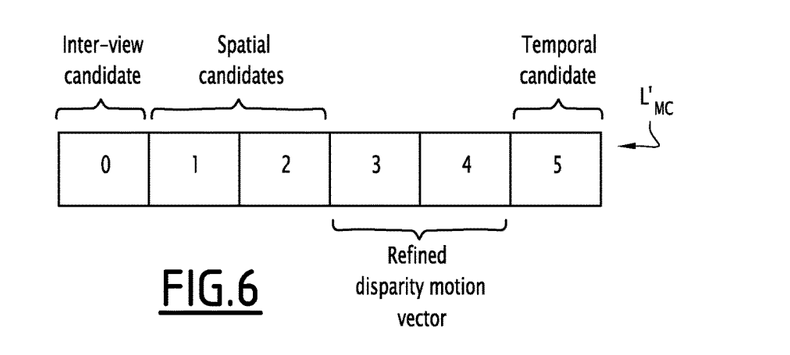
FIG. 6 is a first example of refined list of motion information prediction candidates.

In a preferred embodiment, two refined motion vectors are included in the list of candidates in a manner that preserves a fixed maximal size of the list. The refined motion vectors and their associate reference picture of view Vk−1 are inserted at predetermined positions in the list as motion information predictors, and the other motion information predictors are shifted in the list so as to obtain a refined list $L'_{MC}$. Consequently, if the list $L_{MC}$ initially contains P items (P=6 in the example), the last two items, respectively the "combined" predictor and the "zero" predictor are erased. In an embodiment, which has been found to give satisfactory results on a test set, the refined motion information predictors containing the refined disparity motion vectors are added at indexes 3 and 4 and the respective temporal motion information predictor is shifted at index 5 of the list, as illustrated in the example of FIG. 6.

Figure 7:
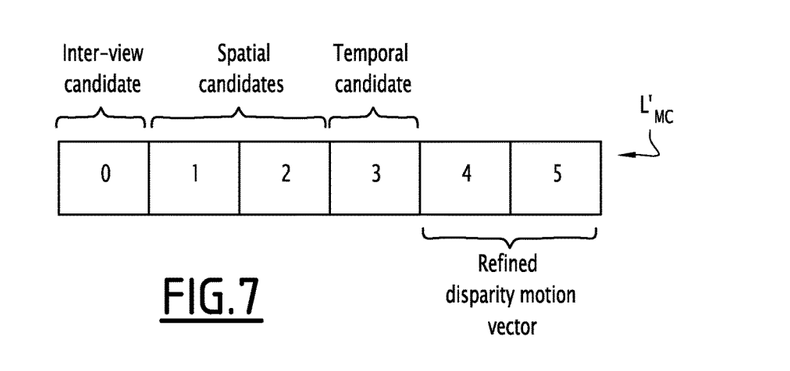
FIG. 7 is a second example of refined list of motion information prediction candidates.

Alternatively, as shown in FIG. 7, the two refined motion information predictors are inserted at the last two positions of the refined list $L'_{MC}$.

In yet another alternative embodiment, the two refined motion information predictors are inserted immediately after the motion information predictor containing a disparity motion vector.

Figure 8:
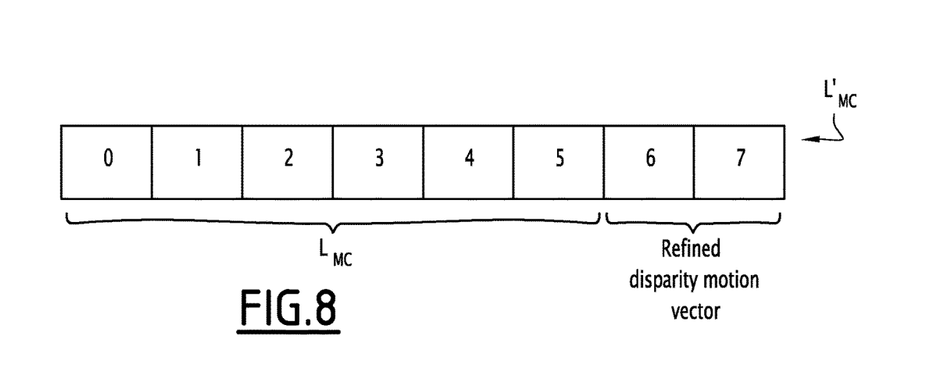
FIG. 8 is a third example of refined list of motion information prediction candidates.

If the maximal size P of the list does not need to be constrained, the two motion information predictors are simply added at the end of the list as shown in FIG. 8.

In the particular case where the motion information prediction list $L_{MC}$ of the current block comprises P−2 or fewer items, the refined list is completed by the two refined motion information predictors without erasing any information.

After the step 84, therefore after a first disparity motion vector has been found in the initial list of candidate motion information predictors $L_{MC}$, the process stops, the motion information prediction candidates of the list being order according to an order reflecting their statistical relevancy for prediction for a large set of test sequences.

The invention is not limited by the exemplary embodiments described above, and comprises any variants that do not depart from its spirit. In particular, other embodiments of refinement of a list of motion information predictors by including refined disparity motion vectors in the list can be envisaged. The embodiments have been described using only the first disparity motion vector encountered, but several disparity motion vectors, if present, may be used.

The invention claimed is:

1. A method for encoding a multi-view video stream comprising at least two video sequences, each video sequence corresponding to a view of a scene,
   the encoding comprising a motion information prediction for a block of a current picture of a current view from a list of candidate motion information predictors, a motion information predictor including at least a motion vector,
   wherein the method comprises, for the encoding of a current block, if a motion information predictor comprising a disparity motion vector pointing to a block of a picture of a video sequence corresponding to a view different from the current view is present in the list of candidate motion information predictors of the current block,
   including in said list of candidate motion information predictors at least one refined motion information predictor comprising a refined disparity motion vector predictor obtained from the disparity motion,
   wherein said refined disparity motion vector predictor is calculated from the disparity motion vector shifted by a predetermined horizontal offset.

2. A method according to claim 1, wherein said including comprises adding said at least one refined motion information predictor to the list of candidate motion information predictors.

3. A method according to claim 1, wherein said including comprises replacing one of the candidate motion information predictors of the list of motion information predictors by a said refined motion information predictor.

4. A method according to claim 1, wherein said including comprises inserting said refined motion information predictor as an item at a predetermined position in the list of candidate motion vector predictors and deleting the last item of the list of candidate motion information predictors so that the size of the list of candidate motion information predictors remains constant.

5. A method according to claim 3, wherein said including comprises including two refined motion information predictors, a first refined motion information predictor comprising a first refined disparity motion vector predictor and a second refined motion information predictor comprising a second refined disparity motion vector predictor, and wherein said first and second refined motion information predictors are inserted at a respective first and second predetermined position in said list of candidate motion information predictors.

6. A method according to claim 1, further comprising including two refined disparity motion vector predictors in the list of candidates, including a first refined disparity motion vector predictor shifted by a first predetermined offset and a second refined disparity motion vector predictor shifted by a second predetermined offset.

7. A method according to claim 6, wherein said first predetermined offset is equal to the negative value of the second predetermined offset.

8. A method according to claim 1, further comprising determining in the list of candidate motion information predictors of the current block a motion information predictor comprising a disparity motion vector pointing to a block of a picture of a video sequence corresponding to a view different from the current view, wherein the said determining step comprises:
scanning the items of the list of candidate motion information predictors, from the first position in the list to the last position of said list,
for each item scanned, determining whether the motion information predictor comprises a disparity motion vector, and
in case of positive determination, stop the scanning.

9. A method of decoding a multi-view video stream comprising at least two video sequences, each video sequence corresponding to a view of a scene,
the decoding comprising a determination of a list of candidate motion information predictors, for a block of a current picture of a current view, a motion information predictor including at least a motion vector,
wherein the method comprises, for the decoding of a current block, if a motion information predictor comprising a disparity motion vector pointing to a block of a picture of a video sequence corresponding to a view different from the current view is comprised in the list of candidate motion information predictors of the current block,
including in said list of candidate motion information predictors at least one refined motion information predictor comprising a refined disparity motion vector predictor obtained from the disparity motion vector,
wherein said refined disparity motion vector predictor is calculated from the disparity motion vector shifted by a predetermined horizontal offset.

10. A method according to claim 9, further comprising selecting in said list of candidate motion information predictors a motion information predictor indicated by said item of information and applying motion compensation using the selected motion information predictor.

11. A method according to claim 9, wherein said including comprises including two refined motion information predictors, a first refined motion information predictor comprising a first refined disparity motion vector predictor and a second refined motion information predictor comprising a second refined disparity motion vector predictor, and wherein said first and second refined motion information predictors are inserted at a respective first and second predetermined position in said list of candidate motion information predictors.

12. An encoder adapted to encode a multi-view video stream comprising at least two video sequences, each video sequence corresponding to a view of a scene,
comprising a unit for motion information prediction for a block of a current picture of a current view from a list of candidate motion information predictors, a motion information predictor including at least a motion vector,
wherein the encoder further comprises, for the encoding of a current block:
a unit, applied if a motion information predictor comprising a disparity motion vector pointing to a block of a picture of a video sequence corresponding to a view different from the current view is present in the list of candidate motion information predictors of the current block, for including in said list of candidate motion information predictors at least one refined motion information predictor comprising a refined disparity motion vector predictor obtained from the disparity motion vector,
wherein said refined disparity motion vector predictor is calculated from the disparity motion vector shifted by a predetermined horizontal offset.

13. A decoder adapted to decode a multi-view video stream comprising at least two video sequences, each video sequence corresponding to a view of a scene, the decoder comprising:
a unit for determining a list of candidate motion information predictors, for a block of a current picture of a current view, a motion information predictor including at least a motion vector,
wherein the decoder comprises, for the decoding of a current block:
a unit, applied if a motion information predictor comprising a disparity motion vector pointing to a block of a picture of a video sequence corresponding to a view different from the current view is present in the list of candidate motion information predictors of the current block, for including in said list of candidate motion information predictors at least one refined motion information predictor comprising a refined disparity motion vector predictor obtained from the disparity motion vector,
wherein said refined disparity motion vector predictor is calculated from the disparity motion vector shifted by a predetermined horizontal offset.

14. A computer program product comprising a non-transitory computer-readable storage medium having thereon instructions that, when executed, cause a processor of a device for encoding a multi-view video stream comprising at least two video sequences, each video sequence corresponding to a view of a scene, to:

obtain motion information prediction for a block of a current picture of a current view from a list of candidate motion information predictors, a motion information predictor including at least a motion vector, and     if a motion information predictor comprising a disparity motion vector pointing to a block of a picture of a video sequence corresponding to a view different from the current view is present in the list of candidate motion information predictors of the current block, for the encoding of a current block, to:

include in said list of candidate motion information predictors at least one refined motion information predictor comprising a refined disparity motion vector predictor obtained from the disparity motion vector,     wherein said refined disparity motion vector predictor is calculated from the disparity motion vector shifted by a predetermined horizontal offset.

15. A computer program product comprising a non-transitory computer-readable storage medium having thereon instructions that, when executed, cause a processor of a device for decoding a multi-view video stream comprising at least two video sequences, each video sequence corresponding to a view of a scene, to:

determine a list of candidate motion information predictors, for a square or rectangular block of a current picture of a current view, a motion information predictor including at least a motion vector, and     if a motion information predictor comprising a disparity motion vector pointing to a block of a picture of a video sequence corresponding to a view different from the current view is present in the list of candidate motion information predictors of the current block, for the decoding of a current block, to:

include in said list of candidate motion information predictors at least one refined motion information predictor comprising a refined disparity motion vector predictor obtained from the disparity motion vector,     wherein said refined disparity motion vector predictor is calculated from the disparity motion vector shifted by a predetermined horizontal offset.

16. A method according to claim 1, further comprising a step of entropic encoding of an item of information representative of the position of a selected motion information predictor in the list of candidate motion information predictors.

17. A method according to claim 9, further comprising a step of entropic decoding of an item of information representative of the position of a selected motion information predictor in the list of candidate motion information predictors.

18. An encoder according to claim 12 comprising a unit of entropic encoding of an item of information representative of the position of a selected motion information predictor in the list of candidate motion information predictors.

19. A decoder according to claim 13 comprising a unit of entropic decoding of an item of information representative of the position of a selected motion information predictor in the list of candidate motion information predictors.

20. A computer program product according to claim 14 to entropic decode an item of information representative of the position of a selected motion information predictor in the list of candidate motion information predictors.

21. A computer program product according to claim 14 to determine in the list of candidate motion information predictors of the current block a motion information predictor comprising a disparity motion vector pointing to a block of a picture of a video sequence corresponding to a view different from the current view.

22. A computer program product according to claim 15 to entropic decode an item of information representative of the position of a selected motion information predictor in the list of candidate motion information predictors.

23. A computer program product according to claim 15 to determine in the list of candidate motion information predictors of the current block a motion information predictor comprising a disparity motion vector pointing to a block of a picture of a video sequence corresponding to a view different from the current view.

\* \* \* \* \*